Nov. 26, 1946.                H. E. WILBERT, SR                2,411,702
                              VEHICLE SIGNAL SWITCH
                        Filed Dec. 27, 1944          3 Sheets-Sheet 3
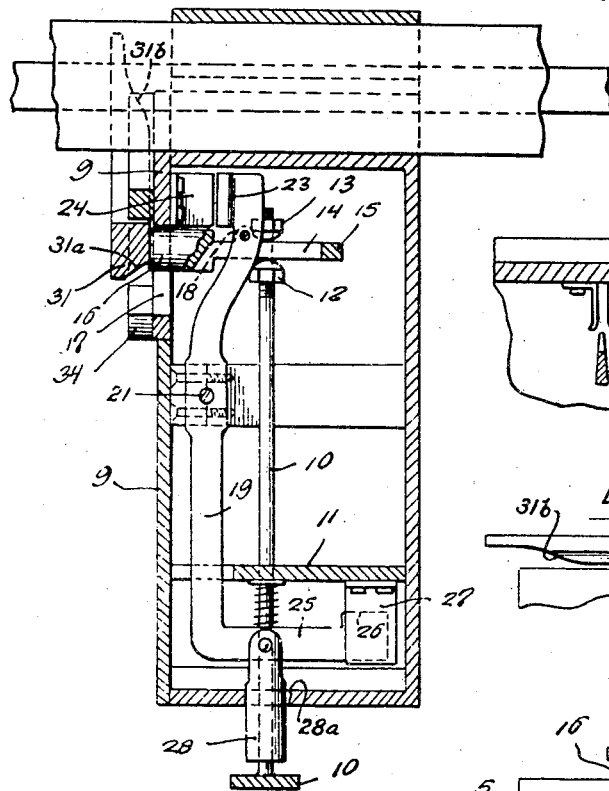
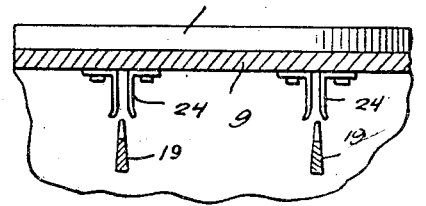
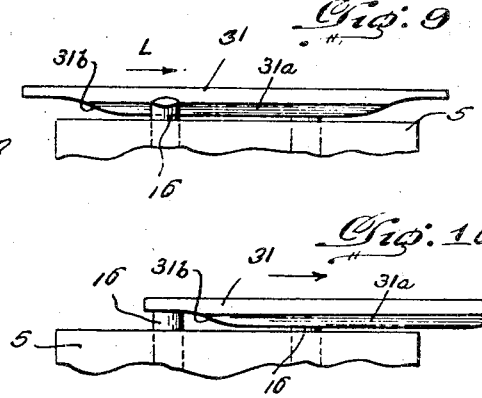
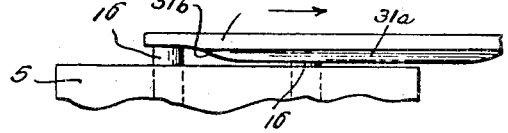
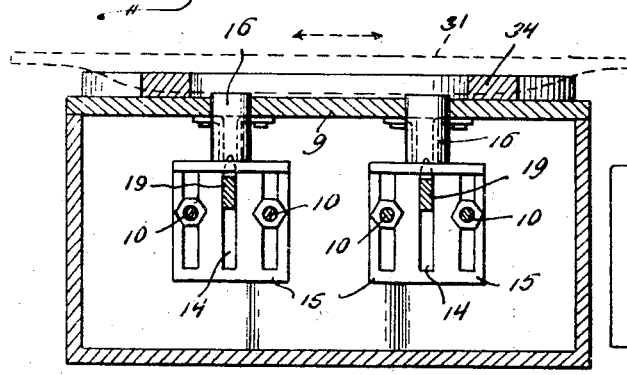
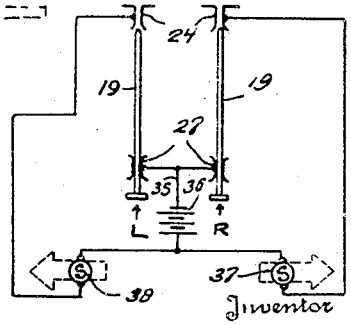
Inventor
Harry E. Wilbert, Sr.,

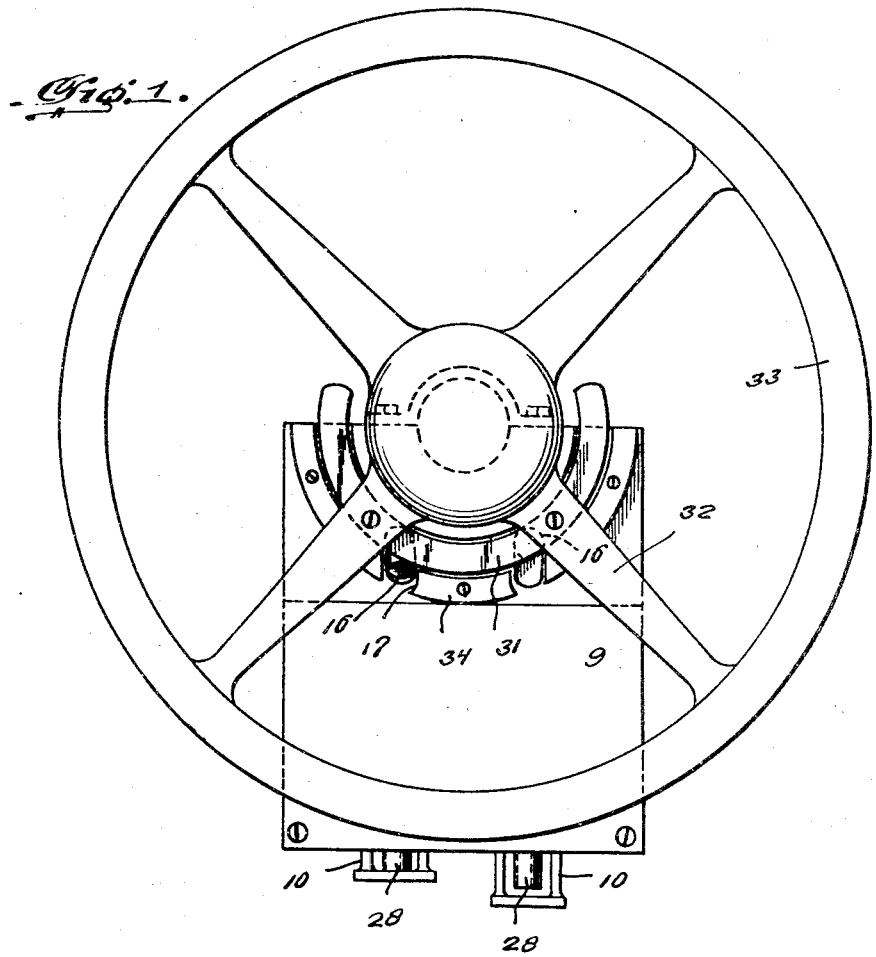
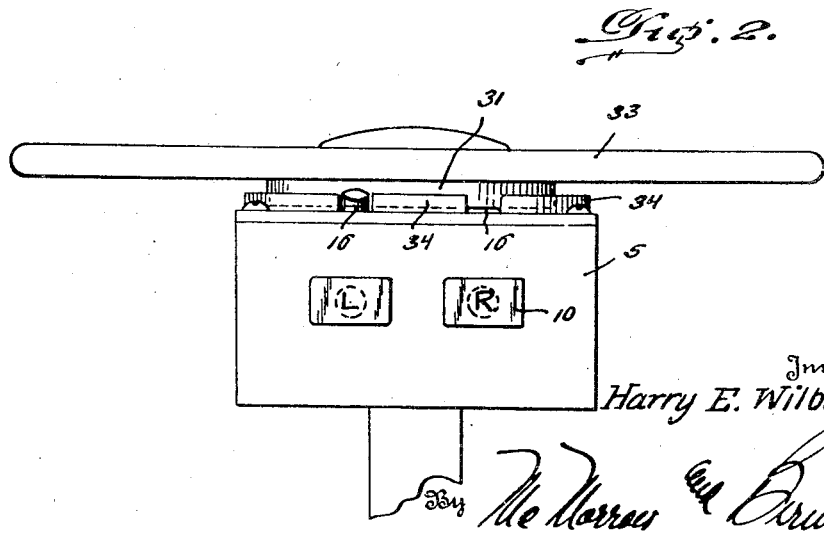

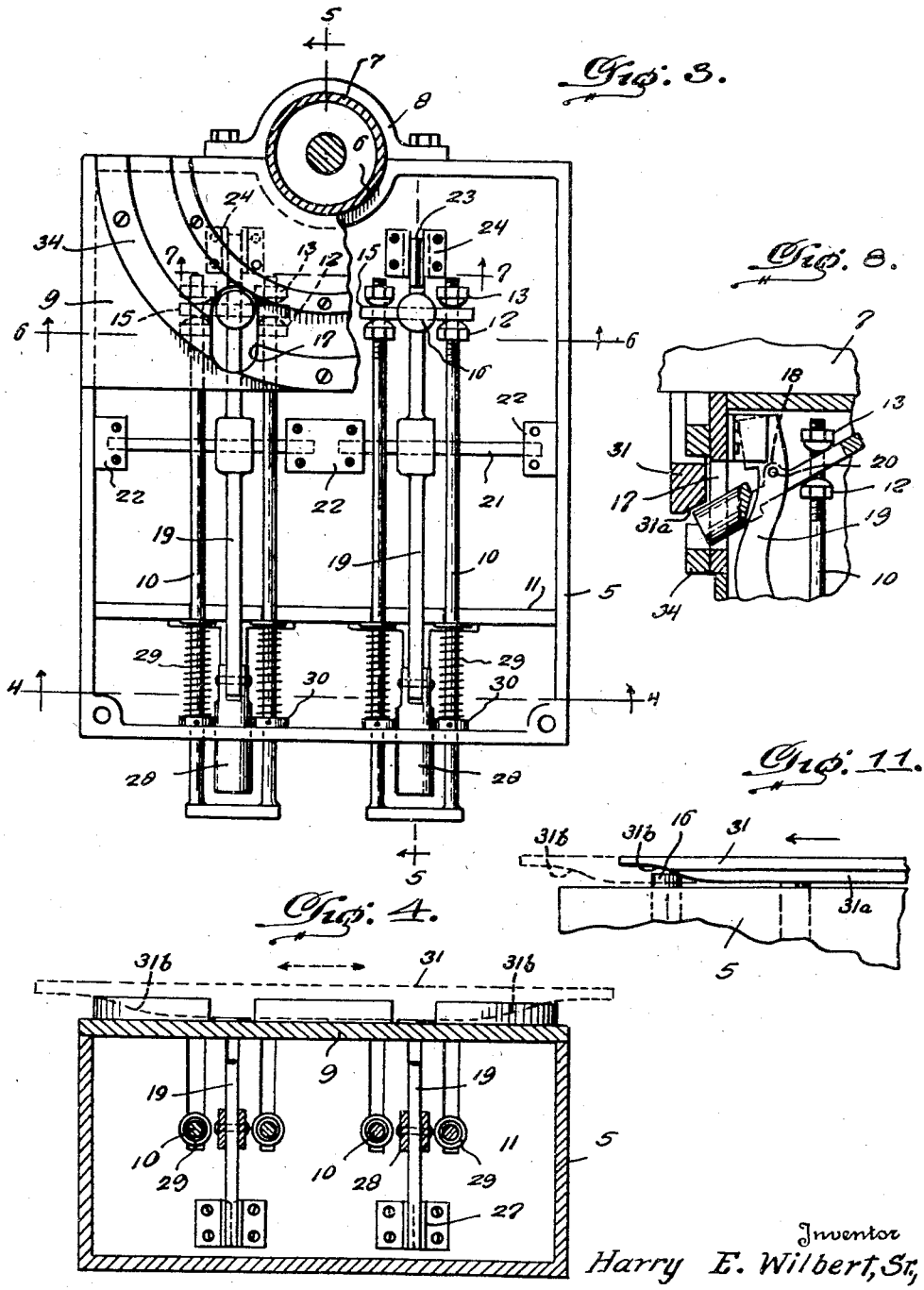

UNITED STATES PATENT OFFICE 2,411,702

VEHICLE SIGNAL SWITCH

Harry E. Wilbert, Sr., Harrisburg, Pa.

Application December 27, 1944, Serial No. 569,935

2 Claims. (Cl. 200—59)

The present invention relates to new and useful improvements in signaling devices for automobiles and other motor driven vehicles embodying means operated by the driver of the vehicle to indicate an intention to turn in either direction.

An important object of the present invention is to provide signaling lamps carried by the vehicle and adapted to be energized by a push button switch means carried by the steering post of the vehicle to energize and maintain the lamps in signaling position for a predetermined interval prior to the turning of the vehicle and also including means carried by the steering wheel for deenergizing the lamps upon the turning of the vehicle in either direction.

A still further object is to provide an apparatus of this character of simple and practical construction, which is efficient and reliable in operation, relatively inexpensive to manufacture and install in operative position upon the vehicle without necessitating any material changes or alterations therein and which otherwise is well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view showing the signaling housing mounted in position on the steering wheel of an automobile.

Figure 2 is a front elevational view thereof.

Figure 3 is a plan view of the signal housing with the cover plate removed therefrom.

Figure 4 is a transverse sectional view taken substantially on a line 4—4 of Figure 3.

Figure 5 is a longitudinal sectional view taken substantially on a line 5—5 of Figure 3.

Figure 6 is a transverse sectional view taken substantially on a line 6—6 of Figure 3.

Figure 7 is a fragmentary sectional view taken substantially on a line 7—7 of Figure 3.

Figure 8 is a fragmentary sectional view showing the switch in closed position.

Figure 9 is a fragmentary elevational view of the cam carried by the steering wheel for opening the switch.

Figure 10 is a similar view showing another position of the cam.

Figure 11 is a similar view showing the cam in position for opening the switch, and Figure 12 is a diagram of the signaling circuit.

Referring now to the drawings in detail wherein for the purpose of illustration I have disclosed a preferred embodiment of the invention, the numeral 5 designates a switch housing having a recess 6 at one end for receiving a steering post 7 for attaching the housing to the post by means of a clamping plate 8, the switch housing being held stationary by the housing for the steering post. The housing 5 is closed by a cover plate 9.

A pair of U-shaped plungers 10 are slidably mounted in the front end of the housing 5 and are slidably supported within the housing by means of a partition 11, the inner ends of the plungers being threaded and provided with inner and outer adjusting nuts 12 and 13.

The inner ends of the plungers are freely inserted through vertically extending slots 14 formed in plates 15 on the lower end of plungers 16 projecting upwardly through an opening 17 in the cover plate 9. The nuts 12 and 13 are positioned at opposite sides of the plates 15.

The plates 15 are also formed with ears 18 to which the inner end of a switch arm 19 is pivotally attached by means of a pin 20.

The switch arm 19 is positioned in spaced parallel relation between the legs of the plunger 10 and is pivotally mounted intermediate its ends on rods 21 secured to the inside of the housing 5 by means of brackets 22. The inner end of the switch arm 19 is formed with an upstanding knife blade 23 adapted for movement into and out of engagement with a pair of spaced apart contacts 24 for frictionally engaging the contacts in the manner of a knife switch.

The front end of the switch arm 19 extends downwardly as indicated at 25 and is formed at its lower end with a switch blade 26 in frictional engagement with a pair of spaced apart contacts 27 secured to the partition 11.

A plunger 28 is pivotally attached to the vertical extension 25 of the switch arm and projects outwardly through an opening 28a in the front end of the housing 5 and in the path of inward movement of the bight portion of the outer end of the plunger 10. It is to be noted that the opening 28a, Figure 5, is of a size slightly larger than the circumference of the plunger 28 and has a gradually increasing sloped side wall extending from the exterior face of the front end of the housing 5 to the interior face thereof. This opening 28a permits free pivotal movement of the plunger 28 when the plunger 10 is pushed inwardly to an extent such that the inner surface of the bight portion of the latter is in contact with the projecting end of the plunger 28.

Coil springs 29 are mounted on the legs of the plunger 10 between the partition 11 and the front wall of the casing and engaging collars 30 secured to the legs of the plunger to yieldably urge the plunger outwardly of the casing and with the bight portion of the plunger spaced slightly outwardly from the plunger 28 of the switch arm.

By reason of this construction the initial inward movement of the plunger 10 will cause a pivotal movement of the plate 15 from the position shown in Figure 5 of the drawings to the position shown in Figure 8 and the subsequent or continued movement of the plunger 10 will cause the bight portion of the plunger 10 to engage the plunger 28 and pivot the switch arm 19 so as to close the circuit between the switch blade 23 and the contacts 24 as well as between the blade 26 and the contacts 27.

The initial inward movement of the plunger 10 will move the plates 15 forwardly and move the plunger 16 rearwardly from its upright position under an arcuate cam 31 into its inclined position and is held in such position by friction against the sloping or beveled edge 31a of the cam. The cam is secured to the underside of the spokes 32 of a steering wheel 33, the cam 31 being adapted to travel in a channeled guide 34 secured to the top 9 of the housing.

The contacts 24 and 27 are connected in the electric circuit of the automobile with the battery 36 and with which the direction switch lamps 37 and 38 are connected, the signaling arms 19 functioning as conductors for making and breaking the circuit for the lamps through the contacts.

The switch arms 19 and contacts 26 and 27 are constructed of conductive material while the housing 5 and remaining parts of the device are constructed of insulation material.

Separate plungers 10, switch arms 19 and their associated parts are provided for the right and left direction signals 37 and 38 and the outer ends of the plungers are marked with suitable legends to correspond with said signals. The plunger 16 is normally held upright, as shown in Figure 5, by the plunger 10, the top of the plunger 16 being positioned under the flat bottom portion of the arcuate cam 31.

In the operation of the device when the driver desires to make a left hand turn, Figure 1, the properly designated plunger 10 is pushed inwardly. The pushing of the plunger 10 inwardly first causes the inner surface of the bight portion of said plunger to be moved until it is in bearing contact with the projecting end of the plunger 28. This movement of the bight portion of the plunger 10 from its normal position to only the point of bearing contact with the complemental end of the plunger 28 results in a slight compression of the springs 29 and shifting of the plate 15 forwardly to a slight extent, the shifting of said plate likewise causing a slight movement of the plunger 16 from its normal position of contact with the under flat surface of the cam, Figure 5, toward the beveled edge 31a of said cam. With the continued pushing inwardly of the plunger 10, the springs 29 are further compressed and the plunger 28 caused to exert a pushing force upon its pivotal connection to the extension 25 of the switch arm 19 to thereby be pivotally moved about such connection. With this pivotal movement of the plunger 28 about its pivotal connection on the extension 25 of the switch arm 19, the switch arm 19 is likewise pivotally moved about its pivot, causing the end of the knife switch 23 and 26 to engage its complemental contact 24 and 27 respectively to close the circuit and energize the left hand signal 38. The movement of the switch arm 19 about its pivot 21 results in pivotal movement of the plunger 16, such movement of the latter causing its advancement to a position such as to engage the beveled surface 31a of the cam 31. Thus, the inward movement of the plunger 10 designated for a left hand turn, as shown in Figure 1, results in the plate 15 and the associated plunger 16 to be shifted from the position illustrated in Figure 5 to the position illustrated in Figure 8. Such inward movement of the plunger 10 likewise results in the shifting of the plunger 16 from a position of contact with the flat under surface of the cam 31 as illustrated in Figures 5 and 6 to a position of contact with the complemental beveled surface 31a of the cam as shown in Figures 8 and 9. The plunger 16 is then held in frictional engagement with the beveled or sloping edge 31a of the cam which will maintain the switch arm in circuit closing position and hold the plunger 10 inwardly against the tension of the springs 29.

The turning of the steering wheel 33 in the proper direction to cause the automobile to execute the indicated left hand turn results in a corresponding arcuate movement of the cam 31. With the arcuate movement of the cam 31, the beveled surface 31a is progressively advanced over the contacting top of the plunger 16, then the tapered surface 31b is so advanced over the contacting top of the plunger 16, and finally at the termination of such movement the under surface of the cam 31 contiguous to the tapered surface 31b is in contacting engagement with the top of the plunger 16, as shown in Figure 10. Upon completion of such movement of the cam 31 in which the top of the plunger is in contacting engagement with the under surface contiguous to the tapered surface 31b, the plunger is released, thereby resulting in the switch arm 19, plunger 28, and plate 15, to return to their normal position under the action of the springs 29.

The same operation occurs for indicating a right hand turn by depressing the plunger 10 for the right hand signal.

It is believed that the details of construction and manner of use of the device will be readily understood from the foregoing without further detailed explanation.

Having thus described the invention, what is claimed is:

1. A vehicle signal comprising a knife switch adapted for making and breaking the circuit with a signal element, said switch being frictionally maintained in circuit closing position, a plunger for moving the switch into closed position, a second plunger adapted for manual operation, a switch releasing member pivoted to the switch and operatively connected to the second plunger, a cam adapted for attaching to a vehicle steering wheel and having a sloping edge, said releasing member being disposed under the cam, said first plunger being disposed in the path of movement of the second plunger to move the releasing member from under the cam into frictional engagement with the sloping edge thereof upon an initial movement of the second plunger, said cam being adapted to travel beyond the releasing member upon a predetermined turning movement of the steering wheel, and spring means carried by said second plunger to move the releasing member into the path of the cam upon a movement of the steering wheel in an opposite direction to open the switch.

2. A vehicle signal comprising a pair of manually operable plungers, including an inner plunger and an outer plunger, said inner plunger being disposed in the path of the outer plunger for subsequent operation of the said inner plunger by the said outer plunger, a switch comprising a switch blade arranged for closing movement by the said inner plunger, a switch releasing member pivoted to said switch blade and operatively connected to the said outer plunger, a cam adapted for attaching to a vehicle steering wheel, said releasing member being normally disposed under the cam and said releasing member being movable from under the cam upon an initial inward movement of said outer plunger, and said releasing member being held in such position until the travel of the cam past said releasing member, and spring means carried by said outer plunger for retracting the latter and moving said releasing member into position for engagement by the cam upon its return movement to open the switch.

HARRY E. WILBERT, Sr.